Aug. 9, 1927.

J. HASSELBERG 1,638,632

SAW SWAGING HAMMER

Filed Dec. 14, 1925

INVENTOR
JENS HASSELBERG
BY Arthur L. Slee.
ATTY

Patented Aug. 9, 1927.

1,638,632

UNITED STATES PATENT OFFICE.

JENS HASSELBERG, OF SACRAMENTO, CALIFORNIA.

SAW-SWAGING HAMMER.

Application filed December 14, 1925. Serial No. 75,348.

My invention relates to improvements in a tool for use by saw filers wherein a hammer is provided with a swaging portion for use in expanding and shaping the raker teeth of saws.

My present invention is particularly directed to an improved tool to be used in setting and shaping the teeth of saws of the type used in cutting timber. As is well known in the art, saws of this type must be kept sharp and the teeth must be accurately set and shaped to meet the particular requirements of the type of timber being cut. Such saws are commonly provided with cutting teeth set and sharpened to cut the timber by means of sharpened points. Between adjacent groups of cutting teeth are provided what are known as raker teeth. The raker teeth are provided with square edges arranged at substantially right angles to the cut of the saw and terminating just back of the points of the cutting teeth. These raker teeth, as is well known, cut away the wood fiber between the points of the cutting teeth, and carry the displaced wood outwardly from the cut. The shaping of these raker teeth plays an extremely important part in the efficiency of the saw, as hereinafter more fully described, and the primary object of my invention is to provide an improved tool which will facilitate the accurate shaping of the raker teeth of saws.

Another object is to provide an improved tool which will both expand and shape the raker teeth of saws.

A further object is to provide an improved tool of the character described which will reduce the time and labor necessary for reshaping the raker teeth of saws.

Another object is to provide a device by which the raker teeth may be quickly and accurately shaped without drawing the temper from the teeth and without danger of breaking the teeth or injuring the saw.

A further object is to provide a device which may be conveniently and efficiently held in accurate operative position relative to a teeth to be shaped.

A further object is to provide a single improved tool which can be used for all ordinary purposes in setting and shaping the teeth of saws and for swaging the cutter teeth.

A still further object is to provide an improved tool which can be economically manufactured and which may be effectively tempered or case hardened for use upon the teeth of saws.

Figure 1:
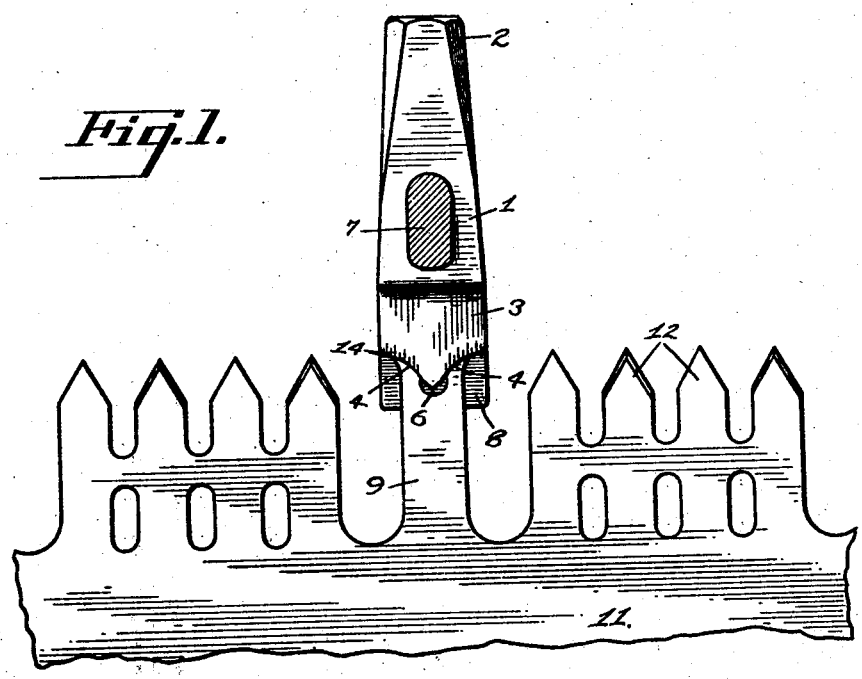

I accomplish these and other objects by means of the improved device disclosed in the drawings forming a part of the present specification wherein like characters of reference are used to designate similar parts throughout said specification and drawings and in which, Fig. 1 is a broken front elevation of a portion of a saw showing the manner in which my improved tool is applied for swaging a raker tooth thereof.

Figure 2:
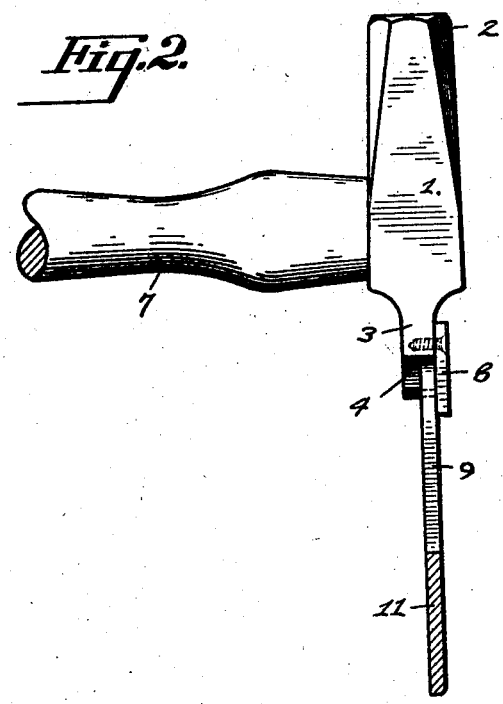

Fig. 2 is a view taken at right angles to Fig. 1, the saw blade being shown in section.

Referring to the drawings, the numeral 1 is used to designate in general, the body portion of my improved saw filer's hammer. One end of the body 1 is slightly tapered to form a striking element 2 of the form commonly provided in hammers for setting the teeth of saws. The opposite end of the body 1 is provided with an extension 3 of reduced thickness to form a swaging portion. A pair of arcuate surfaces 4 are formed upon the outer end of the extension 3, said surfaces being angularly disposed and arranged to meet at a central pointed apex 6. The body 1 has an eye formed therein to receive a handle 7.

A guide 8 is preferably provided upon one side of the swaging portion 3, said guide extending past the pointed apex 6 and forming a face at right angles to the edges of the faces 4.

The guide 8 preferably consists of a flat plate secured upon one side of the swaging portion 3 by means of screws or other suitable securing means whereby the plate may be removed to permit reshaping of the swaging surfaces 4 if desired.

The arcuate faces 4 of the swaging portion 3 are curved and inclined in a manner adapted to define the desired shape to be given to the ends of raker teeth 9 of a cross cut saw 11 of the type used in cutting timber and the like.

In operation the tool is used for swaging the raker teeth 9 of a saw in the following manner. The tool is placed in position upon the top of a raker tooth as shown in Fig. 1 of the drawings, the tool being gripped by means of the handle 7 and held with the guide 8 flat against the back of the tooth 9, thereby insuring that the surfaces 4 will be held square with the supper surfaces of the tooth. The handle 7 is preferably gripped close to the body 1 of the tool so that the forefinger of the operator will engage the adjacent surface of the saw and tooth and act as a guide upon the near side of the saw and tool and to steady the tool upon the tooth. The upper end 2 of the tool is now struck with a hammer or other suitable tool, thereby driving the swaging surfaces onto the edge of the tooth and causing the points to be expanded outwardly and shaped to conform to the curvature of the faces 4.

The tooth 9 is swaged sufficiently to cause the raker teeth to be slightly shorter than the cutting teeth 12 of the saw. At the same time, the arcuate surfaces cause the points to be turned outwardly, with a regular and uniform curvature. This is important as the proper shaping of the ends of the raker teeth cause said teeth to bite into the wood as the saw is reciprocated, thereby obtaining a clean cut through the fiber and at the same time tending to hold the saw against the back of the cut. Calibrations 14 are preferably formed upon the face of the extension 3 along the edges of the surfaces 4, said calibrations operating to form a gage whereby the teeth 9 may be swaged uniformly throughout the length of the saw.

The inclination and curvature of the surfaces 4 is such that when the tool 1 is struck, the blow will be directed to the base of the pointed ends of the tooth, thereby expanding the tooth through the heavy base portion thereof without danger of breaking off the point of the tooth and without requiring any of the temper to be drawn from the saw. This increases the life of the saw and permits it to be used much longer without resharpening. The simplicity effects a big saving in time and labor necessary for swaging the raker teeth.

The striking portion 2 and the swaging portion 3 of the tool are both tempered or case hardened to avoid any marring of the faces against the hardened material of the saw. If necessary the guide 8 may be removed and the temper drawn for the hammer to permit the surfaces 4 to be filed to a desired shape.

Aside from the use in swaging the raker teeth of the saw as above explained, the striking portion 2 may be used as a setting hammer in the ordinary manner, for setting the cutting teeth 12 of the saw.

While I have illustrated and described what I consider to be the preferred form and construction of my improved tool, the device is subject to modification in numerous ways without departing from the spirit of my invention. I therefore do not wish to restrict myself to the specific details of construction shown and described but desire to avail myself of any modifications which may fall within the scope of the appended claims.

Having thus described my invention what I claim as new and desire to secure by Letters Patent is,

1. A saw swaging hammer comprising a body portion having an eye adapted to receive a handle; and a swaging portion formed upon one end of the body and consisting of an extension of reduced thickness having angularly disposed arcuate surfaces formed upon the end thereof, said surfaces being adapted to expand and shape the ends of raker teeth of saws; and a guide adjacent one edge of the swaging portion to engage the back of a tooth.

2. A saw swaging hammer comprising a body having an eye adapted to receive a handle, one end of said body being slightly tapered to form a striking element; a swaging portion formed upon the opposite end of the body said portion being of reduced thickness and having angularly disposed arcuate surfaces formed upon the outer end thereof, said surfaces intersecting at a central apex and being adapted to expand and shape the outer ends of raker teeth of saws; and a guide adjacent one side of the swaging portion to engage the back of a tooth.

3. A saw swaging hammer comprising a body having an eye adapted to receive a handle, one end of said body being slightly tapered to form a striking element; a swaging portion formed upon the opposite end of the body said portion being of reduced thickness and having angularly disposed arcuate surfaces formed upon the outer end thereof, said surfaces intersecting at a central apex and being adapted to expand and shape the outer ends of raker teeth of saws; and a guide detachably secured upon one side of the swaging portion to engage the back of a tooth to facilitate the placing and holding of the hammer in operative position relative to the tooth.

In witness whereof I hereunto set my signature.

JENS HASSELBERG.